INVENTORS
EUGENE O. KEIZER &
MARLIN G. KROGER
BY [signature]
ATTORNEY

March 12, 1957 E. O. KEIZER ET AL 2,785,303

NOISE LIMITER

Filed June 15, 1953 2 Sheets-Sheet 2

INVENTORS
EUGENE O. KEIZER &
MARLIN G. KROGER
BY [signature]
ATTORNEY

United States Patent Office 2,785,303 Patented Mar. 12, 1957

2,785,303

NOISE LIMITER

Eugene O. Keizer, Princeton, N. J., and Marlin G. Kroger, Oak Park, Ill., assignors to Radio Corporation of America, a corporation of Delaware Application June 15, 1953, Serial No. 361,666

The terminal fifteen years of the term of the patent to be granted has been disclaimed 6 Claims. (Cl. 250—20)

Figures 1, 9:
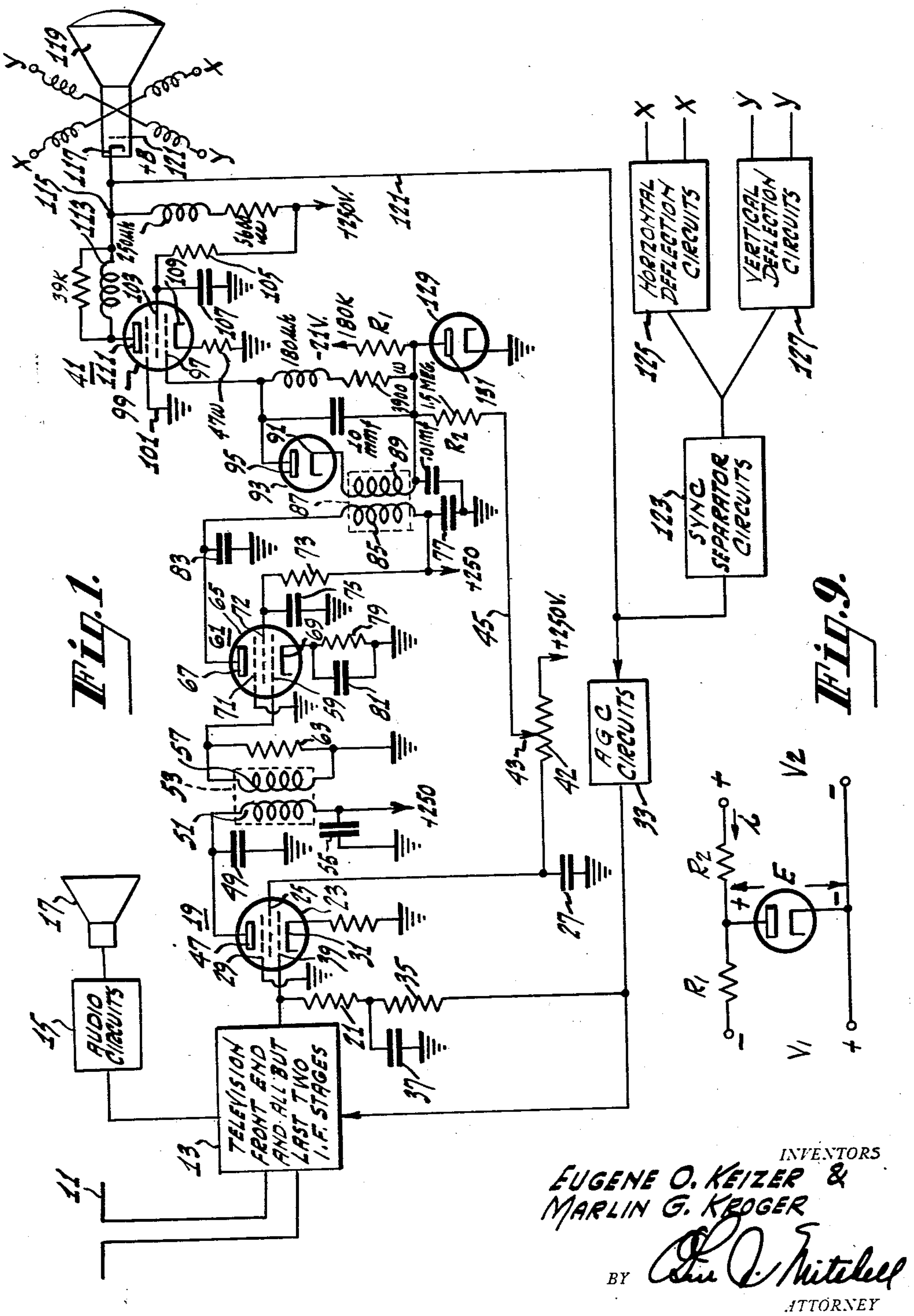

This invention relates to noise limiting in a signal receiver, and more particularly to preventing noise impulses from reaching the picture reproducing and deflection controlling means in a television receiver.

Noise impulses are, primarily, high amplitude disturbances superimposed on a desired signal either in the process of transmission to a receiver or in the initial circuits of the receiver itself where the signal is still at a low level. In order to minimize the effect of such noise, circuits have been devised which will clip off energy above the amplitude of the desired signal itself. Too much clipping will distort the desired signal, so that the ideal objective is to adjust the clipping level to clip amplitudes just above the desired signal level. In approaching this objective, advantage has heretofore been taken of the fact that most electron tubes have a particular negative grid potential at which the tube will cease conduction. This is the cut-off grid potential. Accordingly, noise limiting circuits have consisted of means for detecting the modulated signal in the negative direction and means for establishing the detected negative signal just above the level of cut-off potential of one of the electron tube amplifiers in the receiver. Automatic gain control circuits have been utilized to apply a negative potential, or bias, to the grid of one of the preceding electron tube amplifiers in correspondence with the existing signal strength level. These automatic gain control circuits derive a potential proportional to the potential produced in one of the receiver circuits by the detected signal, and apply such derived potential as negative grid bias to one of the amplifier stages in the receiver. The increased bias has the effect of reducing the gain of the amplifier in the proper amount so that the output will be maintained at a desired level regardless of the received signal strength for all signal strengths exceeding that required to produce the desired amplifier output. By proper choice of the level at which the automatic gain control circuit is set to maintain the amplifier output, the input to a subsequent amplifier will be at a level just above the amplifier cut-off level for all signal strength levels at least equal to the level capable of producing the desired amplifier output. In this manner, noise pulses above that level are clipped off, and the visual or audio reproducing means is rendered unresponsive to them.

However, the automatic gain control circuit does not instantaneously become fully operative when the received signal strength level reaches the point at which the amplifier output will be at the desired level. Hence, it is necessary to adjust the circuit for operation even at signal levels which have not reached the level corresponding to the desired amplifier output. In addition, in order to obtain adequate noise clipping at low signal levels, a certain amount of negative bias should be applied to the amplifier grid at such levels. However, if that is done, as the automatic gain control becomes more nearly fully operative at the higher signal levels the grid bias will become even more negative, and thereby clip and distort the desired video signal itself. A compromise must therefore be made between the two extremes, with the result that existing receivers utilizing automatic gain control have very little grid bias on the noise limiting amplifier for low signal levels. As already indicated, the consequence will be very high susceptibility of the receiver to disturbance due to noise impulses at low signal levels.

In order to obtain adequate noise clipping at low signal levels, and at the same time avoid signal distortion at both low and high signal levels, advantage has heretofore been taken of the effect of the automatic gain control circuit to cause increase of negative bias at the grid of one of the video amplifier stages of the receiver as the signal strength level decreases, and a reduction of this additional bias as the signal level reaches the level for which the automatic gain control circuit is set. This particular solution of the problem is set forth in a now abandoned patent application entitled Noise Limiter, Serial No. 361,649, filed June 15, 1953, by B. E. Denton. As described therein, the decreased negative bias which the automatic gain control circuit applies to one of the intermediate frequency amplifier stages as the signal level decreases produces a decrease in the positive potential of points in the plate or screen voltage supply circuits. This decreased potential is applied to produce a more negative total bias of the video amplifier, thereby causing the cut-off level of the video amplifier to follow the decrease in signal strength. This effectively clips noise even at signal levels below the level for which the automatic gain control circuit is set, i. e., the A. G. C. threshold. In this application, the term "A. G. C. threshold" is used to mean the level of signal strength at which the automatic gain control circuit is first capable of producing a potential which will maintain the video amplifier output essentially at the desired level. To avoid distortion of higher strength signals by clipping, the bias on the video amplifier is made to become less negative as the signal level increases. However, it is necessary to assure that the bias never becomes positive even at high level signals, for this would produce grid current and signal clipping, consequently distorting the signals. This is accomplished in the application referred to above by providing an external source of constant negative bias which exists even at the A. G. C. threshold. Also, since this constant bias should not be so large as to materially reduce desired gain at low signal strength levels, additional bias is provided to the video amplifier which varies in proportion with signal level. The latter bias is supplied by the customary cathode resistor and bypass condenser.

This circuit will normally produce excellent results. However, in cases where the brightness level of the televised signal is varying at a very slow rate, the cathode bias circuit will tend to degenerate the brightness component of the signal. In addition, at all signal levels a direct current component is introduced into the video amplifier output, and it varies to some extent with signal level. This will appear on the screen of the picture reproducing means as a distortion of true background illumination level. A further problem is presented by the fact that negative bias on the video amplifier grid will inevitably reduce the voltage gain of the video amplifier and so prevent maximum utilization of the available gain of this stage even though it may be desired at high signal levels. This problem can be overcome by careful choice of the components and voltage values in the biasing circuits, so that a total bias of zero will result at the A. G. C. threshold level. However, very slight variation in the values of these components or voltages, such as must be expected due to manufacturing tolerances and aging, may so overbalance the bias that it will become positive at or slightly above A. G. C. threshold. The result would be distortion of signals at that level.

Accordingly, it is an object of this invention to provide noise clipping at all signal levels while positively preventing any possibility of positive video amplifier grid potential even though the video amplifier grid potential is to be held at zero for signal levels equal to or above the A. G. C. threshold.

It is a further object of this invention to provide adequate noise clipping at all signal levels, while avoiding distortion of high strength signals, avoiding distortion of the brightness information in the video signal, and utilizing the available gain of the video amplifier to its maximum at signal levels equal to or above the A. G. C. threshold.

It is a still further object to provide noise clipping with maximum utilization of gain of the video amplifier at signal levels above A. G. C. threshold without critical design or choice of the components of the circuits which are utilized to provide noise clipping bias to the video amplifier.

The invention accomplishes these objectives by utilization of an improved method of preventing a positive voltage from ever being built up between the grid of a video amplifier and ground, even though the potential between those points would tend to become positive at high signal levels. Negative bias which provides adequate noise clipping at low signal levels is provided to the video amplifier by a voltage divider circuit connected between a source of constant negative potential and a source of positive potential which becomes more positive at high signal strength levels and less positive at low signal strength levels. This potential is produced at a point in the screen or plate supply circuits of an A. G. C. controlled video amplifier. The constant negative potential, and the values of the resistors in the voltage divider circuit, are so chosen that the increasing positive potential applied to the voltage divider results in a net bias of zero at the A. G. C. threshold level, or as close to zero as desired for a given level of the A. G. C. potential. The rate of decrease of the bias can be made to follow at any desired proportion of the rate of signal strength increase. This is accomplished by including a grounded diode in the bias circuit, which clamps the bias at zero as a maximum. Hence no negative bias need exist at signal levels at least corresponding to the A. G. C. threshold level.

Other and incidental objects of the invention will become apparent after a reading of the following description of the invention and an inspection of the drawings wherein:

Figure 1 shows by block and circuit diagram an embodiment of the invention in a typical television receiver.

Figure 2:
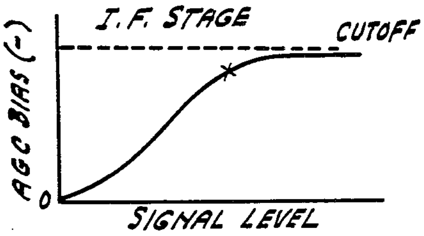

Figure 2 is a graph showing the variation of grid bias on the grid of an A. G. C. controlled intermediate frequency amplifier stage as signal strength level varies.

Figure 3:
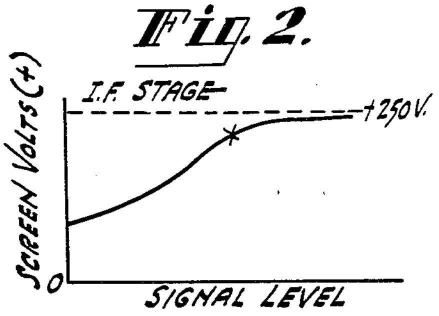

Figure 3 is a graph showing the variation in the potential of the screen grid of the A. G. C. controlled intermediate frequency amplifier stage.

Figure 4:
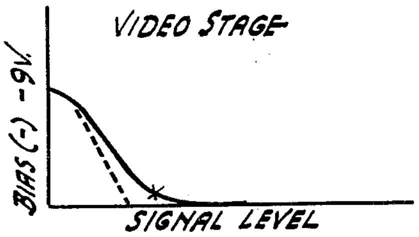

Figure 4 is a graph showing the variation of grid bias on the controlled video amplifier stage produced as the signal strength level varies. The dotted curve illustrated an alternative bias variation characteristic which is obtainable with the practice of the invention.

Figure 5:
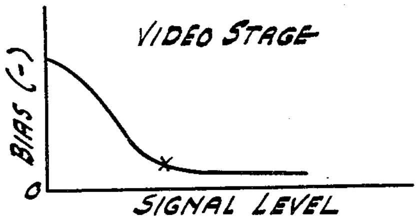

Figure 5 is a graph showing the grid bias variation of a controlled video amplifier stage in accordance with the bias control circuit which would be necessary in the absence of the invention described herein, or with the invention but set to maintain some negative bias even at signals equal to or exceeding the A. G. C. threshold level.

Figure 6:
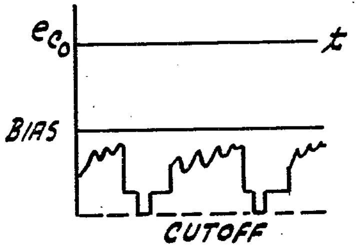
Figure 7:
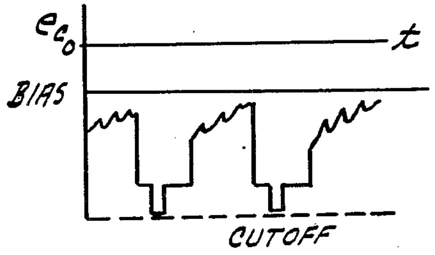
Figure 8:
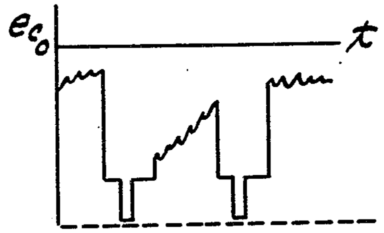

Figures 6, 7 and 8, respectively, show how the grid bias of the controlled video amplifier varies with signal strength so as to maintain cutoff just above the top of the signal for signals of low, intermediate and high strength levels.

Figure 9 illustrates the electrical equivalent of the invented portion of the circuit in Figure 1.

Referring in detail to Figure 1, the antenna 11 receives the television signal. The signal is then amplified, mixed with the output of the local oscillator and converted to the intermediate frequency in the mixer in the usual television receiver "front end" included in block 13. The video modulated I. F. components of the signal may be separated from the audio components, amplified, and brought to the intermediate frequency amplifier preceding the last intermediate frequency amplifier. The circuits by which this process is accomplished are well known in the art, and not being part of the inventive subject matter have been generally designated by block 13. The audio modulated I. F. components of the signal are separated, detected and amplified by audio circuits designated generally by block 15, and are rendered audible by a suitable transducer, such as a loudspeaker, designated generally by 17. The audio signal process forms no part of the inventive subject matter, and has been indicated solely to clearly indicate how the invention may be connected in cooperation with the circuits of the popular television receivers.

Directing attention now to the video modulated I. F. signal as it is brought to the I. F. stage 19, the signal appears across the grid leak resistor 21. This resistor also forms part of the tuned output circuit of the preceding intermediate frequency amplifier. While any amplifying device having three or more terminals could be used in I. F. stage 19, for directness and clarity of description, and in view of prevailing general usage, a pentode 23 has been shown. Said pentode has a screen grid 25 supplied with a positive potential from source +250 v. through a voltage dropping resistor 42. In order to prevent degeneration, dropping resistor 42 is bypassed to ground for the intermediate frequency by a condenser 27. Pentode 23 also has a suppressor grid 29 connected to ground potential, and a cathode 31 connected to ground potential. Grid bias for I. F. stage 19 is supplied through the automatic gain control circuits 33, which are connected to grid leak resistor 21 through an I. F. filter consisting of resistor 35 and a condenser 37. The upper end of grid leak resistor 21 is connected to the control grid 39 of pentode 23. Automatic gain control circuits 33 derive potential from the output of video amplifier 41, and provide a negative D.-C. potential which becomes more negative with increases in the level of strength of the output of video amplifier 41, and conversely. The term "level of strength" is used herein to denote a potential which is in proportion to the average potential of the tips of the synchronizing pulses which are superimposed on the picture information prior to transmission as a composite video signal. As is well known in the art, for a constant amplitude carrier wave the tips of the synchronizing pulses are all at the same potential, i. e. "lined up." Hence, variation in the level of potential of these pulses is a measure of variation in carrier amplitude, independently of variation in brightness of the scene being televised. Accordingly, signal "level of strength" is determined by carrier wave amplitude. With increased signal level of strength, A. G. C. circuits 33 provide more negative bias for intermediate frequency amplifier grid 39. A decrease in signal level strength results in less negative bias supplied to said grid 39. This bias variation is depicted in Figure 2. At the point marked X, which represents the A. G. C. threshold, the A. G. C. circuits are fully operative to maintain a constant level of strength of the output of video amplifier 41. However, since normally used A. G. C. circuits do not instantly reach threshold level, these circuits are adjusted to begin operation at lower signal levels and to build up to the threshold level. This accounts for the curvature of the curve shown in Figure 2 between point X and O signal level. The net potential on screen grid 25 is determined by the difference of the potential of source +250 v. and the voltage drop due to current flowing in screen resistor 42. With increasing bias on control grid 39, the space current in pentode 23 will decrease, as is characteristic of all grid controlled vacuum tubes. This phenomenon is well known to those skilled in the art. The decreased space current will result in less current flow through resistor 42, and therefore, an increase in the potential of screen grid 25. At zero signal strength level there will be no bias on grid 39 and maximum current flow through resistor 42, with consequent minimum potential of screen grid 25. This variation in the potential of screen grid 25 with signal strength level is shown in Figure 3, where point X corresponds to conditions when the signal strength has reached the level of the A. G. C. threshold. Rheostat 43 variably connected to resistor 42 transfers a desired portion of the screen grid potential through conductor 45 to the terminal of resistor $R_2$. Returning now to I. F. amplifier 19, the plate 47 of pentode 23 is connected to the common connection point of condenser 49 and the primary winding 51 of the transformer 53. The other terminal of winding 51 is connected to D.-C. plate supply voltage +250 v., with +250 v. being bypassed to ground by condenser 55 to avoid feedback through the power supply circuits associated with +250 v. The secondary winding 57 of transformer 53 is connected to ground potential at one end, and at the other end to the grid 59 of the last intermediate frequency amplifier 61. Shunted across the terminals of winding 57 is resistor 63. Transformer 53, condenser 49 and resistor 63 form a band-pass tuned circuit of the kind customarily used in television receivers and well known in the art. Intermediate frequency amplifier 61 is shown as comprising a pentode 65 having a plate 67, a cathode 69, a suppressor grid 71 connected to ground potential, and a screen grid 72 connected through screen dropping resistor 73 to a source of positive potential +250 v. Screen dropping resistor 73 is bypassed by condenser 75, and potential source B+ is bypassed by condenser 77. Grid bias for pentode 65 is supplied by cathode resistor 79 and condenser 81 in parallel and connected to ground. The plate 67 is connected to the common connection point of condenser 83 and primary winding 85 of transformer 87. Again, this forms a band pass tuned circuit as described in connection with I. F. amplifier 19. The secondary winding 89 of transformer 87 is connected to the cathode 91 of a diode 93. While I. F. amplifier 61 has been shown comprising a pentode 65, any amplifying device having three or more terminals could be easily substituted in the circuit shown. Also, diode 93 is meant to represent any unidirectional conducting device, and has been shown as a diode simply for convenience of description. Diode 93 has its plate 95 connected to the grid 97 of video amplifier pentode 99. Diode 93 functions as a detector of the video modulated I. F. signal which appears at its cathode by virtue of coupling to the preceding I. F. amplifiers as described above. It is so connected that it detects the negative half of the video component of the complete modulated signal, so that for increasing signal strength the detected video signal applied to grid 97 will extend further in the negative direction. The plate 95 of diode 93 is shunted to ground by condensers 10 $\mu\mu$f. and .01 mf. It is also shunted to ground via the .01 mf. condenser by inductor 180 $\mu$h. and resistor 3900. This arrangement forms a filter for the intermediate frequencies in the detected signal, and a peaking circuit for the video signal frequencies which amplifier 41 is intended to amplify. Amplifier 41 has been shown as comprising a pentode 99 although any amplifying device having three or more terminals could be adapted for inclusion in the circuit with very minor circuit modifications. Pentode 99 has a suppressor grid 101 connected to ground, a screen grid 103 connected through resistor 105 to potential source +250 v. Resistor 105 is bypassed by condenser 107. Pentode 99 also has a cathode 109, which is practically identically connected to ground potential. Resistor 47$\omega$ is connected between cathode 109 and ground simply as a safety measure in the event the biasing circuits later described herein are accidentally disconnected. The plate 111 of pentode 99 is connected to inductor 113 shunted by resistor 39K. The other terminal of this shunt combination is connected to the terminal of series connected inductor 250 $\mu$h. and resistor 5600$w$, the other terminal of which series combination is connected to source +150 v. The junction point 115 is connected to the cathode 117 of cathode ray tube 119. This arrangement of circuits connected to plate 111 serves to provide uniform response of amplifier 41 over the range of frequencies covered by the detected video signal. Cathode ray tube 119 has a grid 121 connected to a positive source +B, and vertical and horizontal deflection coils Y—Y and X—X respectively. It is to be understood that while deflection is shown here as accomplished by means of coils, the invention will operate equally well where deflection is accomplished by means of electrostatic plates. Both deflection systems or well known in the art and are therefore not described in any further detail. Also connected to point 115 is conductor 121 which provides the input to A. G. C. circuits 33 which operate as described above. Conductor 121 also provides the input to synchronizing pulse separation circuits shown generally at 123, which in turn supplies the input to horizontal deflection circuits shown generally at 125 and vertical deflection circuits shown generally at 127. The outputs of these circuits are respectively connected to the vertical and horizontal deflection coils Y—Y and X—X. Inasmuch as the circutis by which synchronization is accomplished form no part of the inventive subject matter, they are not described in further detail herein.

The invention herein is comprised in Figure 1 by the indicated arrangement of resistors 42, $R_2$, $R_1$, negative source of potential −21 v. connected to one terminal of $R_1$, and diode 129 connected between the common connection point of resistors $R_1$ and $R_2$ and ground potential, and the connection of said common connection point in the grid circuit of pentode 99 as indicated in Figure 1. As indicated above, the potential applied to the terminal of resistor $R_2$ is a selected portion or all of the potential of screen grid 25 of intermediate amplifier stage 19. This potential is a minimum when no signal is being received and rises to approach a constant maximum equal to source voltage +250 v. at very high signal strength level above the A. G. C. threshold. The value of the potential −21 v. and the ratio of resistors $R_1$ and $R_2$ are so chosen that a negative potential appears at the plate 131 of diode 129 which is most negative when the potential of screen grid 25 of I. F. amplifier 19 is least positive, i. e. at no signal or very low signal strength signal levels. Said values are also so chosen that when the received signal strength reaches the level corresponding to the A. G. C. threshold the net potential at the plate 131 of diode 139 will be any desired negative value down to a minimum of zero. The potential at the plate of said diode is connected to the grid 97 of pentode 99 through resistor 3900 and inductor 180 $\mu$h. The net result is that the bias on grid 97 will be at a predetermined maximum negative level when no signal is being received, and will gradually become less negative as received signal strength increases. When received signal strength reaches the level corresponding to the A. G. C. threshold the bias on grid 97 will become zero or as close to zero, negatively, as desired. As is well known in the art, the amplification of electron tube amplifiers increases with decreasing grid bias potential and becomes a maximum at zero grid bias. Hence, by the arrangement indicated, amplifier stage 41 will provide maximum amplification for all signals equal to or exceeding the level corresponding to the A. G. C. threshold. This will have the additional effect of avoiding insertion of a bias voltage component dependent on signal strength in the output of amplifier stage 41, thereby avoiding distortion of the brightness information in the video signal, which is represented by the D.-C. potential level of the detected video signal. This fact is a consequence of the mtthod of transmission of video signals wherein increased brightness levels produce a lower average level of both the positive and negative halfs of the composite modulated video signal. An additional result of the indicated circuit arrangement is due to the fact that the noise clipping produced by pentode 99 depends on how closely the detected video signal applied to grid 97 in the negative direction approaches that negative potential at which pentode 99 is rendered non-conductive, i. e., cutoff. As is well known in the art, when the potential of the grid of an electron tube becomes more negative than a level depending on the tube characteristics and plate voltage, the tube will no longer be able to conduct current to its plate circuit. As shown in Figure 6, at very low signal levels the bias on grid 97 is sufficiently negative so that the signal variations almost reach the point of cutoff. At a greater signal strength, as in Figure 7, the bias on grid 97 is reduced by the invention so as to permit full signal variation without reaching cutoff point, but approaching it so closely that any noise pulses of greater amplitude than the video signal itself will be beyond the cut-off point. At signal levels at least equal to that to which the A. G. C. circuits will maintain the input to amplifier 21 constant, i. e., the A. G. C. threshold, the bias supplied by the invented circuit reduces to zero and the signal completely covers the range between zero voltage on grid 97 and a voltage just slightly less negative than the cut-off point. This is depicted in Figure 8. A graph of the manner in which the bias of grid 97 varies with signal strength level is shown in Figure 4. The solid curve corresponds to adjustment of the values of resistors $R_1$ and $R_2$ and source −21 v., so that the bias just becomes equal to zero, by virtue of careful choice of those values, at signal levels corresponding to the A. G. C. threshold. The dotted curve shows how a greater rate of bias variation can be obtained, by suitable choice of $R_1$, $R_2$ and source voltage −21 v., which tends to produce a positive bias at grid 97 but is prevented from doing so due to the fact that diode 129 conducts at substantially zero voltage drop as soon as the potential at its plate 131 tends to become positive.

From this description it is evident that the invention affords great latitude in selection of the rate of bias variation on amplifier stage 41, and therefore of the extent of noise clipping which exists at any given signal level. It will also be appreciated that where the noise conditions prevalent in any areas are such that the cut-off point of tube 99 is itself inadequate to suppress noise pulses sufficiently, rheostat 43 can be adjusted to supply a smaller positive potential to resistor $R_2$ at all signal levels and thereby produce a minimum negative bias at signal levels corresponding to the A. G. C. threshold. This condition would correspond to that shown in Figure 5. Figure 5 also indicates bias variation in the invention of E. B. Denton, described in the above referenced abandoned patent application entitled "Noise Limiter," wherein some amount of net negative bias will generally exist at the grid 97 of video amplifier 41.

The invention shows its benefit to a maximum in television receivers wherein it is desired to use one video amplifier stage of very high gain coupled directly to control the cathode ray tube. In such a case, it is highly desirable to operate the video amplifier at zero bias. Automatic gain control is still used to control the amplitude of the video modulated radio frequency signal prior to detection, but the video signal itself is amplified as much as possible. This permits maximum utilization of the amplification capability of the video amplifier tube, while still providing adequate noise clipping at both low and high signal strength levels. Also, as indicated above, reduction of the bias added by the invention to zero at the A. G. C. threshold, avoids distortion of the background information in the signal and clipping of very strong video signals.

The invention can be analyzed by reference to the equivalent circuit shown in Figure 9. Here, $V_2$ represents the potential at screen grid 25 of I. F. amplifier 19.

$V_1$ represents a potential designated in Figure 1 as −21 v. E represents the potential applied to grid 97 of video amplifier 41; "$i$" represents the current flow produced in resistors $R_1$ and $R_2$ by virtue of $V_1$ and $V_2$. By reference to Figure 9:

$$V_2=i(R_1+R_2)-V_1$$

$$i=\frac{V_2+V_1}{R_1+R_2}$$

$$E=V_2-iR_2=V_2-\frac{R_2V_2}{R_1+R_2}-\frac{R_2V_1}{R_1+R_2}$$

$$E=\frac{V_2R_1-V_1R_2}{R_1+R_2}=\frac{V_2-\frac{R_2}{R_1}V_1}{1+\frac{R_2}{R_1}}$$

$$dE=\frac{1}{1+\frac{R_2}{R_1}}dV_2$$

To illustrate the effect of the above generalized relationships, suppose that $R_1$=180 kilohms and $R_2$=1.5 megohms. As shown in Figure 1, a suitable value of the source of screen voltage is +250 volts. Also, a suitable value of the potential applied to $R_1$ is −21 volts. The rheostat 43 can be considered moved to the extreme left, placing the full screen grid voltage of amplifier 19 in the circuit. At a signal corresponding to A. G. C. threshold, due to rather low screen current, the screen voltage may be about 175 volts. At zero signal, with no bias provided by the A. G. C. circuit, the screen voltage may be 120 volts. These values are representative of the operation of typical A. G. C. circuits.

Accordingly, $$\frac{R_2}{R_1}=8.33;\ E=\frac{V_2-8.33\times 21}{9.33}=\frac{V_2-175}{9.33}$$

At A. G. C. threshold;

$$E=\frac{175-175}{9.33}=0$$

At zero signal;

$$E=\frac{120-175}{9.33}=-5.9 \text{ volts}$$

The last generalized equation above shows that by proper choice of the ratio of resistors $R_1$ and $R_2$, the rate of variation of the potential applied to grid 97 can be made any desired fraction of the rate of variation of the screen grid 25 potential, which, in turn, reflects the variation in signal strength rate itself.

It will be readily apparent that instead of obtaining the variable potential produced by the automatic gain control circuits from the screen dropping resistor 42 of the penultimate intermediate frequency stage, that potential variation could be taken from a plate potential dropping resistor which could be included in that stage. In addition, any amplifier stage in the receiver which is controlled by the automatic gain control circuit could be utilized as the source of potential applied to resistor $R_2$. Hence, intermediate frequency amplifier 19 in Figure 1 should be regarded as being any automatic gain controlled amplifier in the receiver. A further possible modification is to take the input potential for the automatic gain control circuits 33 from any point at or after the video detector at which the synchronizing pulses are lined up. In addition, where more than one video amplifier stage is utilized, any of those stages, or even any two or more, may be bias controlled as described above in accordance with the invention.

Even more generally, since any electron tube has a saturation point the invention can be applied to video receivers which are not gain controlled. The only necessity is that some point be provided in the receiver at which the D. C. potential varies in correspondence with the level of strength of the received signal. This point can be connected to the terminal of resistor $R_2$ as shown in Figure 1, and the invention will be operable if the proper biasing, as described in detail above, is applied to video amplifier stage 41.

As will be apparent from the above detailed description, the invention provides a maximum degree of noise clipping for all signal strength levels consistent with freedom from distortion of high strength signals and adequate amplification of low strength signals. It accomplishes this by a circuit which encompasses the advantages of maximum utilization of the available gain of the video amplifier tube, complete avoidance distortion of background level for high strength signals, and permitted use of sufficiently small negative bias at low signal strength levels so as to obtain the maximum gain even at those levels consistent with the prevalent noise conditions. By adjustment of the values of the components of the circuit, the added noise clipping bias can be made to disappear at any desired fractional rate of increasing signal strength. In addition, the circuit components are not highly critical in adjustment or value, thereby greatly simplifying the design problems involved in including the invention in a typical television receiver.

What is claimed is:

1. In a television receiver for receiving television signals having a synchronizing component, a noise pulse limiting system comprising: means for detecting said received signals, means for amplifying said detected signals, said detecting means connected to convey said detected signals to said amplifying means with said synchronizing component extending in a negative direction, said amplifying means including means causing said amplifying means to become effectively inoperative at a first predetermined negative level of said detected signals, a source of potential which approaches a second predetermined negative level as the strength of said signals decreases and which becomes less negative as the strength of said received signals increases, means for applying said potential to said amplifying means, and means coupled with said amplifier and potential source for effectively removing said potential from said amplifying means when said signals reach an amplitude corresponding to a third predetermined level, regardless of the value of said potential when said received signals are below said third predetermined level.

2. In a television receiver, a detector of television signals having pulse-like synchronizing signal excursions, an amplifier of said detected signals, said amplifier comprising an input terminal, an output terminal and a control terminal, said amplifier being effectively inoperative to pass signal excursions causing its control terminal to exceed a selectable negative level, said detector being connected to supply said detected signals with said pulse excursions extending in a negative direction relative to said control terminal, automatic gain control means connected to maintain the output level of said amplifier at a predetermined regulated level for substantially all levels of strength of said received signals which at least equal the level for which said amplifier is capable of producing signals of said predetermined regulated level of output, said gain control means operative to produce a variable positive potential which varies from a first preselected positive level at low signal strength levels to a second pre-selected higher positive level at high signal strength levels, said variable positive potential being connected to a bias control circuit, said bias control circuit being connected to said amplifier control terminal, said bias control circuit including means operative to produce a negative potential of a magnitude dependent on the variation of the potential of said variable positive potential and variable at a selected proportion of variation of said variable positive potential, and a unidirectional conducting device connected to said bias control circuit which prevents said bias control circuit from ever applying a positive potential to said amplifier control terminal.

3. The invention substantially as described in claim 2, characterized further in that said bias control circuit comprises series connected resistors, a source of constant negative potential connected to one terminal of said resistors, said point of variable positive potential connected to another terminal of said resistors, a connection from the junction of said resistors to the said control terminal, said unidirectional conducting device connected between the junction of said resistors and the point of zero potential in a direction permitting conduction only toward said point of zero potential, and said point of variable potential connected to the other terminal of said resistors through a rheostat.

4. In a television receiving system the combination of: a terminal means defining a potential datum; a source of demodulated video signal having synchronizing signal component extending in a negative going direction relative to said potential datum; an amplifier means having input electrodes corresponding to a control electrode and cathode; input circuit means connected with said input electrodes and said video signal source for driving said amplifier means with video signal; a source of relatively fixed bias connected with said input circuit establishing said control electrode at a negative potential relative to said cathode; means responsive to received television signal strength and connected with said datum potential means to develop a bias control potential whose value increases in a positive direction relative to said datum potential terminal means in response to an increase in signal strength; direct current coupling means connected with said bias control potential developing means and said input circuit to supplement said relatively fixed bias with said bias control potential in such polarity that the net bias potential of said control electrode relative to said cathode changes in a positive direction as signal strength increases; and voltage limiting means connected with said input circuit and said datum terminal such to prevent the potential of said control electrode from becoming positive relative to said cathode.

5. A television receiving system according to claim 4 wherein said input circuit and said fixed bias source include means establishing said control electrode positive with respect to said datum terminal means; and wherein means are additionally provided connected with said datum terminal means and said cathode for establishing said cathode at a sufficiently positive potential relative to said datum terminal that it is positive relative to said control electrode.

6. A television receiving system according to claim 4 wherein said source of demodulated video signal comprises a diode detector circuit inductively coupled to a source of intermediate frequency television signal and wherein means are provided connected with said datum and said diode detector circuit for including said detector circuit in said circuit and establishing every point in said detector circuit at a direct current potential above the potential of said datum potential terminal means.

References Cited in the file of this patent

UNITED STATES PATENTS

| | | |
|---|---|---|
| 2,505,367 | Shaw | Apr. 25, 1950 |
| 2,606,247 | Fyler | Aug. 5, 1952 |
| 2,627,022 | Anderson | Jan. 27, 1953 |
| 2,653,226 | Mattingly | Sept. 22, 1953 |